United States Patent
Lane, Jr. et al.

(10) Patent No.: US 7,689,373 B1
(45) Date of Patent: Mar. 30, 2010

(54) USB VIBRATION DATA ACQUISITION

(75) Inventors: Richard Truman Lane, Jr., Gardnerville, NV (US); Thomas Franklin Kalb, Gardnerville, NV (US); Michael Lee Kidd, Gardnerville, NV (US); Nathan Andrew Weller, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/239,106

(22) Filed: Sep. 26, 2008

(51) Int. Cl.
*G01H 9/00* (2006.01)

(52) U.S. Cl. .................. 702/56; 348/207.1; 702/185; 709/219

(58) Field of Classification Search .............. 702/32, 702/35, 36, 44, 56, 75, 77, 104, 185, 188; 73/577, 594; 348/207.1; 709/219; 700/108; 701/36
See application file for complete search history.

(56) References Cited

U.S. PATENT DOCUMENTS

| | | | |
|---|---|---|---|
| 6,577,337 B1 * | 6/2003 | Kang | 348/207.1 |
| 6,868,348 B1 * | 3/2005 | Stoutenburg et al. | 702/56 |
| 7,020,565 B2 * | 3/2006 | Nelson et al. | 702/56 |
| 7,317,994 B2 | 1/2008 | Iyer et al. | |
| 2005/0262221 A1 * | 11/2005 | Daniels et al. | 709/219 |

* cited by examiner

*Primary Examiner*—John H Le
(74) *Attorney, Agent, or Firm*—Cantor Colburn LLP

(57) ABSTRACT

A system for collecting and analyzing vibration data is provided. The system includes: at least one sensor for sensing vibrations and producing an electrical signal corresponding to the sensed vibrations; a Universal Serial Bus (USB) communication device for receiving the electrical signal corresponding to the sensed vibrations from the at least one sensor and conditioning and sampling the electrical signal to produce a conditioned signal; and a data collector for receiving the conditioned signal and storing the conditioned signal in a data storage device.

19 Claims, 3 Drawing Sheets

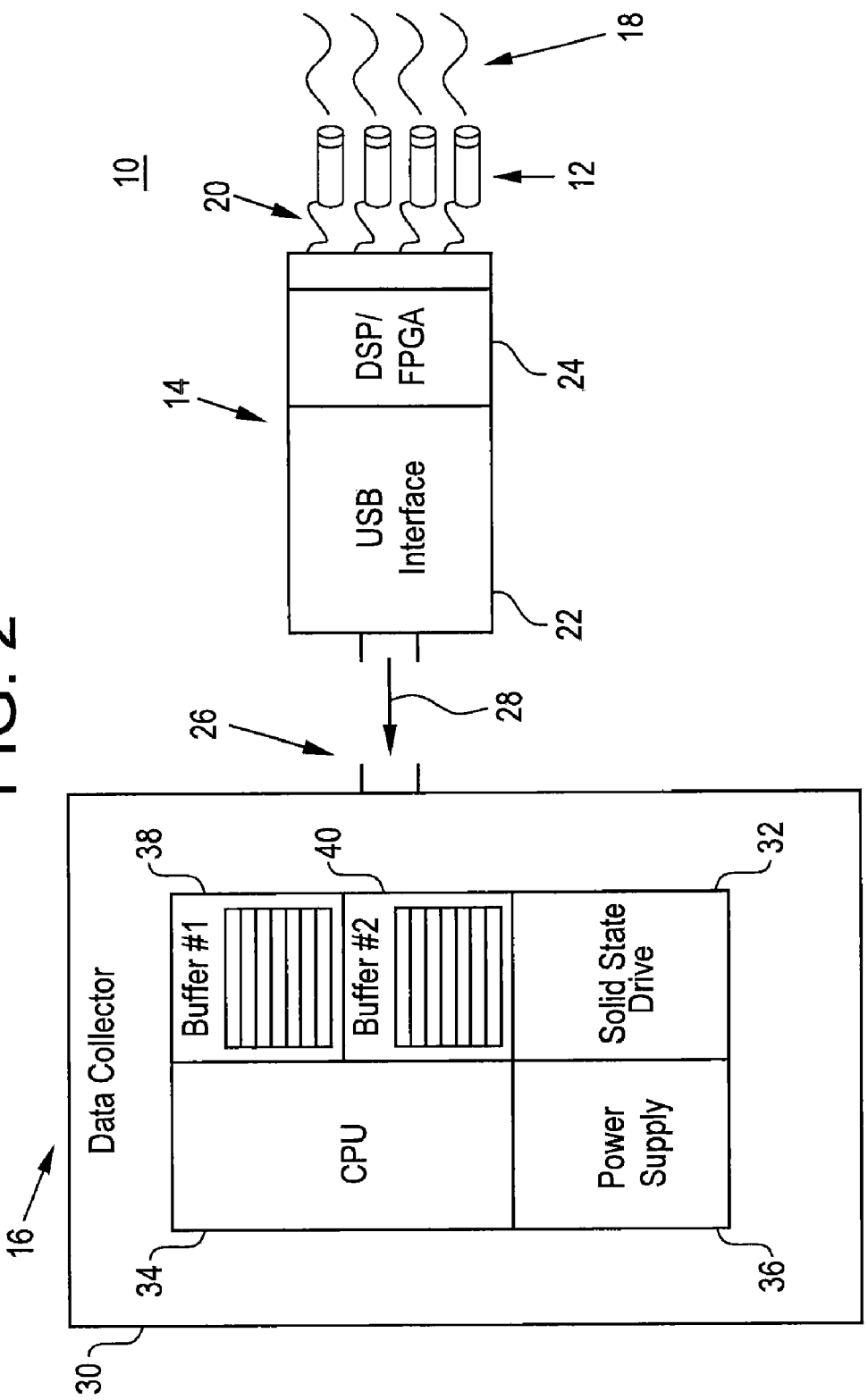

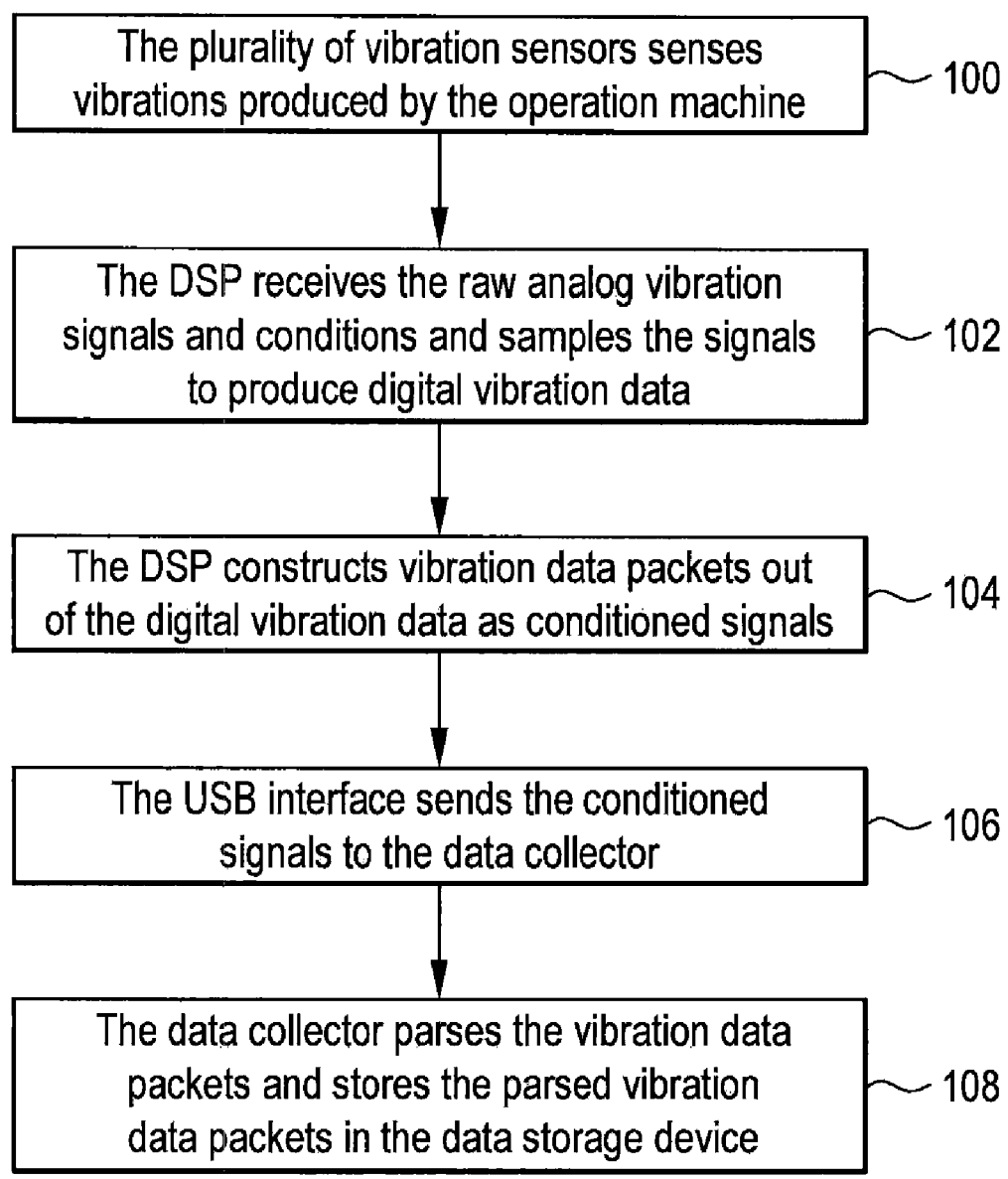

USB VIBRATION DATA ACQUISITION

BACKGROUND OF THE INVENTION

The subject matter disclosed herein relates to a portable data collector and analyzer for diagnosing machinery and, more particularly, to a portable data collector and analyzer with a Universal Serial Bus (USB) interface for transferring data at a high-rate.

Traditionally, rotating machinery diagnostics has required large and bulky test equipment along with a large amount of data to properly diagnose machine vibration problems. The bulky test equipment must be operated close to a power source and in a harsh environment. A device must be designed to have the same technical capabilities as the large and bulky test equipment, but must be compact in size and have the ability to be operated with a battery for at least 6 to 8 hours.

BRIEF DESCRIPTION OF THE INVENTION

In one embodiment, a system for collecting and analyzing vibration data is provided. The system includes at least one sensor for sensing vibrations and producing an electrical signal corresponding to the sensed vibrations; a Universal Serial Bus (USB) communication device for receiving the electrical signal corresponding to the sensed vibrations from the at least one sensor and conditioning and sampling the electrical signal to produce a conditioned signal; and a data collector for receiving the conditioned signal and storing the conditioned signal in a data storage device.

In another embodiment, a vibration data acquisition system is provided. The portable system includes at least one sensor for sensing vibrations and producing an electrical signal corresponding to the sensed vibrations; a Universal Serial Bus (USB) communication device for receiving the electrical signal corresponding to the sensed vibrations from the at least one sensor and conditioning and sampling the electrical signal to produce a conditioned signal; and a data collector for receiving the conditioned signal and storing the conditioned signal in a data storage device, the data collector including a power supply configured to supply power to the USB communication device.

In yet another embodiment, a portable vibration data acquisition system is provided. The portable system includes at least one sensor for sensing vibrations and producing an electrical signal corresponding to the sensed vibrations; a Universal Serial Bus (USB) communication device for receiving the electrical signal corresponding to the sensed vibrations from the at least one sensor and conditioning and sampling the electrical signal to produce a conditioned signal; a data collector for receiving the conditioned signal and storing the conditioned signal in a data storage device, the data collector includes a power supply configured to supply power to the USB communication device; and at least one set of buffers for temporarily storing the conditioned signal before being stored in the data storage device.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a schematic of a vibration data acquisition system having a set of buffers for temporarily storing vibration data before being stored in a data storage device in accordance with an exemplary embodiment of the present invention; and FIG. 3 is a flow chart of a method for transferring raw analog vibration signals from multiple sensors and converting the signals into self describing data objects for storage onto a data storage device in accordance with an exemplary embodiment of the present invention.

Figure 1:
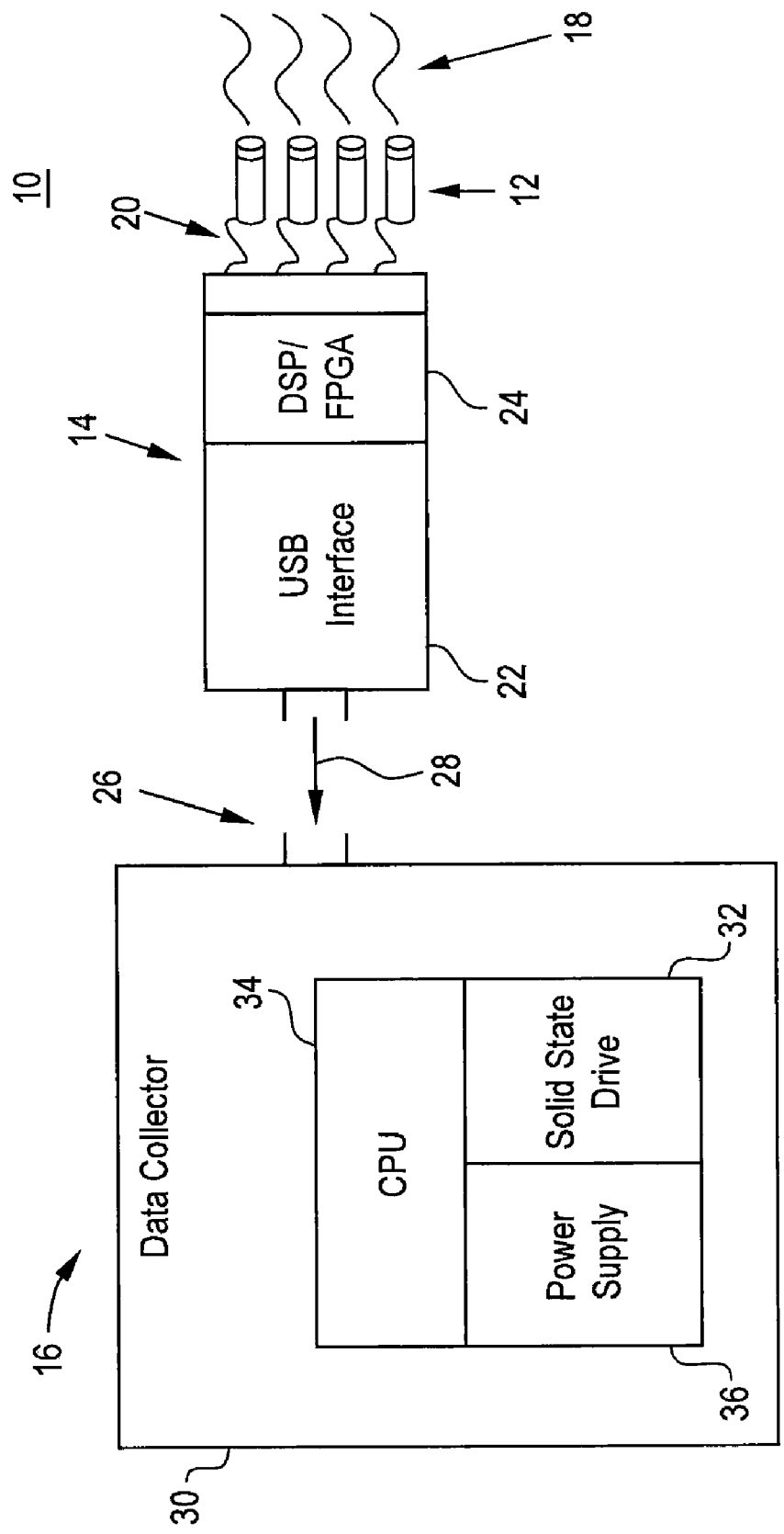
FIG. 1 is a schematic of a vibration data acquisition system having a USB communications device that consumes low amounts of power and enables high data throughput in accordance with an exemplary embodiment of the present invention.

The detailed description explains embodiments of the invention, together with advantages and features, by way of example with reference to the drawings.

DETAILED DESCRIPTION OF THE INVENTION

Exemplary embodiments are directed to a system for collecting and analyzing vibration data that includes a USB interface as the primary communication link between sensors and a computer interface of the system in accordance with one embodiment. Further, in these embodiments, the system continuously takes raw analog vibration signals from multiple sensors and converts the signals into self describing data objects (e.g., digital data) for storage onto a data storage device (e.g., non-volatile solid state device) while maintaining a high rate of data transfer in accordance with one exemplary embodiment. The USB interface consumes low amounts of power and still effectively provides a high rate of data throughput.

For a better understanding of the invention and its operation, turning now to the drawings, FIG. 1 illustrates a portable vibration data acquisition system 10 in accordance with one exemplary embodiment of the present invention. The system includes one or more sensors 12, a USB communications device 14, and a data collector device 16. For simplistic purposes, the one or more sensors 12 will be described herein as a plurality of sensors 12. However, it should be understood that a single sensor can be used in exemplary embodiments of the present invention.

The plurality of sensors 12 is configured to continuously sense vibrations or raw analog vibration signals, which are depicted as lines 18, produced by an operating machine (not shown). The plurality of sensors 12 produce electrical signals corresponding to the raw analog vibration signals or sensed vibrations. One end of each of the plurality of sensors 12 is placed against the machine to sense vibrations, which are often indicative of the condition of the machine, while another end of each of the plurality of sensors 12 is correspondingly coupled to the USB communications device 14 via signal lines 20. While signal lines 20 are depicted as single lines, it should be understood that each of these single lines may also represent twisted wire pairs or wireless communication. Of course, other suitable communication means for transmitting the sensed vibration signals can be used in other exemplary embodiments and should not be limited to the configurations illustrated herein.

In accordance with one non-limiting exemplary embodiment, each of the plurality of sensors 12 includes a vibration transducer. Each of the plurality of sensors 12 may also include a proximity sensor, velocimeter, accelerometer, or any other sensing device that is capable of sensing vibrations in other exemplary embodiments. FIG. 1 illustrates four sensors for sensing vibrations. However, it should be understood that less or more than four sensors can be used to sense vibrations depending on the application and should not be limited to the configuration as shown.

In accordance with one embodiment, the USB communication device 14 includes a USB interface 22 and a digital signal processor (DSP) 24 or a field-programmable gate array (FPGA). One end of the USB communication device 14 is coupled to the plurality of sensors 12 while the other end of the USB communication device 14 is coupled to the data collector 16 via a USB connector 26. The USB communication device 14 operably receives the electrical signals from the sensors and is configured to transfer vibration data to the data collector 16 via the USB connector 26. In particular, the DSP 24 receives the electrical signals from the sensors 12 for conditioning and sampling the electrical signals to produce a conditioned signal and the USB interface 22 transfers the conditioned signal to the data collector 16 through the USB connector 26. The DSP 24 is configured to sample the raw analog vibration signals at different sampling rates in accordance with one exemplary embodiment.

The USB interface 22 can be any conventional USB interface 22 suitable for transferring data to the data collector 16 at a high-rate while having the power consumption equivalent to more traditional interfaces (i.e. Ethernet, RS-232). However, the USB interface 22 has the ability to be suspended to the data collector 16 when not in use and does not require a separate power source to operate or internet service, which can be difficult to obtain at times. Thus, a continuous digital vibration data flow, which is depicted by arrow 28, can be formed between the USB interface 22 and the data collector 16.

The DSP 24 includes one or more analog to digital converters (not shown) for converting the analog vibration data to self-describing data objects or digital vibration data. In accordance with one embodiment, the DSP 24 is configured to construct vibration data packets out of the digital vibration data as conditioned signals, which are sent to the data collector 16 by the USB interface 22 for storage and/or further processing.

The data collector 16 can be any conventional data collecting device suitable for collecting vibration data. In one embodiment, the data collector 16 includes a housing 30 and a data storage device 32 for storing vibration data. In accordance with one non-limiting exemplary embodiment, the data collector 16 is portable. Of course, the data collector 16 can be a stationary device in other exemplary embodiments. In accordance with one non-limiting embodiment, the data storage device 32 is a solid-state device disposed within the housing 30. Of course, any suitable data storage type can be used in accordance with exemplary embodiments of the present invention. The data collector 16 includes a central processing unit (CPU) 34 for controlling the operations of the data collector 16. In one example, the CPU 34 parses the vibration data packets and archives the vibration data to the appropriate directory in the data storage device 32 of the data collector 16. In another example, the CPU 34 performs various measurements (e.g., decimation on conditioned signal, digital filtering, etc.) and stores the output in the data storage device 32. The CPU 34 can be any conventional processing unit configured for carrying out the methods and/or functions described herein. In one exemplary embodiment, the CPU 34 comprises a combination of hardware and/or software/firmware with a computer program that, when loaded and executed, permits the CPU 34 to operate such that it carries out the methods described herein.

The data collector 16 further includes a power supply 36 for providing electrical power to the components in the system 10. In one embodiment, the power supply 36 is a rechargeable battery that can hold enough power to allow the user to complete a test without the need to recharge the power supply 36 while still being compact in size. For example, the power supply 36 can be a rechargeable battery with a battery life of approximately 6 to 8 hours. In another example, the power supply 36 can be a non-rechargeable battery with a battery life of approximately 6 to 8 hours. It should be understood that the power supply 36 can be any size and hold up to any amounts of electrical power depending on the application and should not be limited to the examples set forth above.

In accordance with one embodiment, the power supply 36 of the data collector 16 provides electrical power to the USB communication device 14 and the components thereof via the USB connector 26. As such, when the USB communication device 14 is coupled to the housing 30 of the data collector 16, the USB communication device 14 can be powered up when the data collector 16 is powered up. When the data collector 16 is powered down or in hibernation, the USB communication device 14 is placed in the same state, thereby further minimizing the consumption of power from the power supply 36. The power supply 36 may also effectively power the plurality of sensors 12 in accordance with one embodiment. In an alternate embodiment, the sensors 12 are powered by a separate power source.

In one exemplary embodiment, the data collector 16 further includes a first set of buffers 38 for temporarily storing the vibration data packets and a second set of buffers 40 for temporarily storing the parsed vibration data packets before being stored in the data storage device 32 as shown in FIG. 2. In this embodiment, each conditioned signal from the USB interface 22 is stored in one of the buffers in the first set of buffers 38 in a sequential fashion. For example, one conditioned signal is stored in the first buffer; the next conditioned signal is stored in the second buffer; and so forth. As the buffers in the first set of buffers 38 are being filled or once the first set of buffers 38 are full, the CPU 34 takes the conditioned signals from the first set of buffers 38 one at a time and parses the signals and temporarily stores the parsed signals in the second set of buffers 40 in an orderly fashion. As the buffers in the second set of buffers 40 are being filled or once the second set of buffers 40 are full, the CPU 34 takes the parsed signals from the second set of buffers 40 and archives the parsed signals into the data storage device 32 in an orderly fashion. This process is continuous until all data is saved onto the data storage device 32. It is contemplated that only a single set of buffers is used to temporarily store parsed signals. Of course, the number of buffer sets may vary depending on the application and should not be limited to the configurations herein. It should be understood that the conditioned signals from the USB interface 14 may also be saved directly onto the data storage device 32 without being parsed in accordance with other exemplary embodiments.

Now referring to FIG. 3, a method for transferring raw analog vibration signals from multiple sensors and converting the signals into self describing data objects for storage onto a data storage device in accordance with one exemplary embodiment will now be discussed.

At step 100, the plurality of sensors 12 senses vibrations produced by the operating machine. The plurality of sensors 12 produce electrical signals corresponding to the raw analog vibration signals.

At step 102, the DSP 24 receives the raw analog vibrations and conditions and samples the signals to produce digital vibration data. The DSP 24 converts the analog vibration data to digital vibration data utilizing analog to digital converters.

At step 104, the DSP 24 constructs vibration data packets out of the digital vibration data as conditioned signals.

At step 106, the USB interface 22 sends the conditioned signals (vibration data packets) to the data collector 16.

At step 108, the data collector 16 parses the vibration data packets and stores the parsed vibration data packets in the data storage device 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for collecting and analyzing vibration data, the system comprising:
    at least one sensor for sensing vibrations and producing an electrical signal corresponding to the sensed vibrations;
    a Universal Serial Bus (USB) communication device coupled to the at least one sensor, the USB communication device receiving the electrical signal corresponding to the sensed vibrations from the at least one sensor and conditioning and sampling the electrical signal to produce a conditioned signal; and
    a data collector coupled to the USB communication device, the data collector receiving the conditioned signal and storing the conditioned signal in a data storage device.

2. The system of claim 1 further comprising a central processing unit for controlling the operations of the system.

3. The system of claim 1 further comprising at least one set of buffers for temporarily storing the conditioned signal before being stored in the data storage device.

4. The system of claim 1, wherein the USB communication device includes a digital signal processor for conditioning and sampling the electrical signal.

5. The system of claim 4, wherein the digital signal processor is configured to sample the electrical signal at different sampling rates.

6. The system of claim 1, wherein the USB communication device includes a USB interface for transferring the conditioned signal to the data collector.

7. The system of claim 1, wherein the data collector includes a power supply configured to supply power to the USB communication device.

8. The system of claim 1, wherein each of the plurality of sensors comprises a vibration transducer that produces electrical signals in response to vibrations.

9. The system of claim 1, wherein the data storage device is a solid-state drive.

10. A vibration data acquisition system, comprising:
    at least one sensor for sensing vibrations and producing an electrical signal corresponding to the sensed vibrations;
    a Universal Serial Bus (USB) communication device coupled to the at least one sensor, the USB communication device receiving the electrical signal corresponding to the sensed vibrations from the at least one sensor and conditioning and sampling the electrical signal to produce a conditioned signal; and
    a data collector a data collector coupled to the USB communication device, the data collector receiving the conditioned signal and storing the conditioned signal in a data storage device, the data collector including a power supply configured to supply power to the USB communication device.

11. The system of claim 10 further comprising a central processing unit for controlling the operations of the system.

12. The system of claim 10 further comprising at least one set of buffers for temporarily storing the conditioned signal before being stored in the data storage device.

13. The system of claim 10, wherein the USB communication device includes a digital signal processor for conditioning and sampling the electrical signal.

14. The system of claim 13, wherein the digital signal processor is configured to sample the electrical signal at different sampling rates.

15. The system of claim 10, wherein the USB communication device includes a USB interface for transferring the conditioned signal to the data collector.

16. The system of claim 10, wherein each of the plurality of sensors comprises a vibration transducer that produces electrical signals in response to vibrations.

17. The system of claim 10, wherein the data storage device is a solid-state drive.

18. A portable vibration data acquisition system, comprising:
    at least one sensor for sensing vibrations and producing an electrical signal corresponding to the sensed vibrations;
    a Universal Serial Bus (USB) communication device coupled to the at least one sensor, the USB communication device receiving the electrical signal corresponding to the sensed vibrations from the at least one sensor and conditioning and sampling the electrical signal to produce a conditioned signal;
    a portable data collector coupled to the USB communication device, the portable data collector receiving the conditioned signal and storing the conditioned signal in a data storage device, the data collector including a power supply configured to supply power to the USB communication device; and
    at least one set of buffers for temporarily storing the conditioned signal before being stored in the data storage device.

19. The system of claim 18, wherein the USB communication device includes a digital signal processor for conditioning and sampling the electrical signal, the USB communication device further includes a USB interface for transferring the conditioned signal to the data collector.

* * * * *